… … … …

United States Patent [19]
Rauch

[11] Patent Number: 6,113,069
[45] Date of Patent: Sep. 5, 2000

[54] THROTTLE BODY MODULE HAVING IMPROVED FLUID TIGHTNESS

[75] Inventor: James Richard Rauch, Grass Lake, Mich.

[73] Assignee: Ford Motor Company, Dearborn, Mich.

[21] Appl. No.: 09/260,201

[22] Filed: Mar. 1, 1999

[51] Int. Cl.[7] .................................................. F16K 1/22
[52] U.S. Cl. ............................................................ 251/305
[58] Field of Search .................................. 251/305, 306; 123/337

[56] References Cited

U.S. PATENT DOCUMENTS

| | | | |
|---|---|---|---|
| 3,228,653 | 1/1966 | Trimmer | 251/306 |
| 5,005,535 | 4/1991 | Binversie et al. | 123/52 M |
| 5,029,811 | 7/1991 | Yamamoto et al. | 251/306 |
| 5,715,782 | 2/1998 | Elder | 123/184.61 |
| 5,868,114 | 2/1999 | Kamimura et al. | 123/399 |
| 5,875,758 | 3/1999 | Fujita | 123/336 |
| 5,878,715 | 3/1999 | Hernandez et al. | 123/337 |
| 5,881,695 | 3/1999 | Apel | 123/337 |
| 5,979,871 | 11/1999 | Forbes et al. | 251/305 |

*Primary Examiner*—Kevin Shaver
*Assistant Examiner*—Eric Keasel
*Attorney, Agent, or Firm*—Rhonda L. McCoy-Pfau

[57] ABSTRACT

A throttle body (61) has a first body part (62) containing an upstream portion of the through-bore (68) and a second body part (64) containing a downstream portion of the through-bore. The two body parts are joined together to register the downstream portion of the through-bore as a continuation of the upstream portion at respective confronting faces of the two body parts, capturing bearing assemblies (94, 96) of a throttle mechanism (92) between the confronting faces to thereby journal the shaft on opposite wall portions of the throttle body. A gasket (116) is disposed between the confronting faces to circumferentially seal the through-bore, including sealing between the bearing assemblies and the confronting face of the first throttle body part.

7 Claims, 15 Drawing Sheets

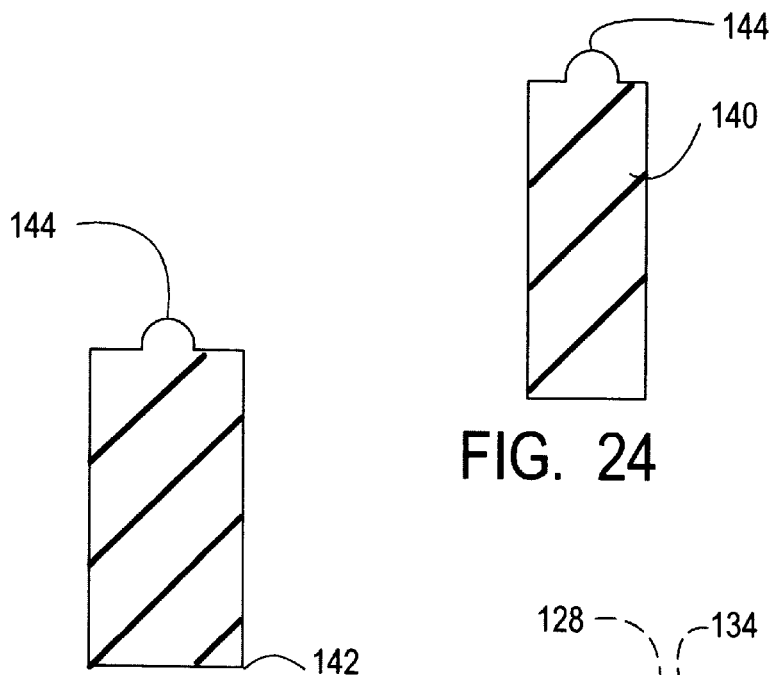
FIG. 24
FIG. 25
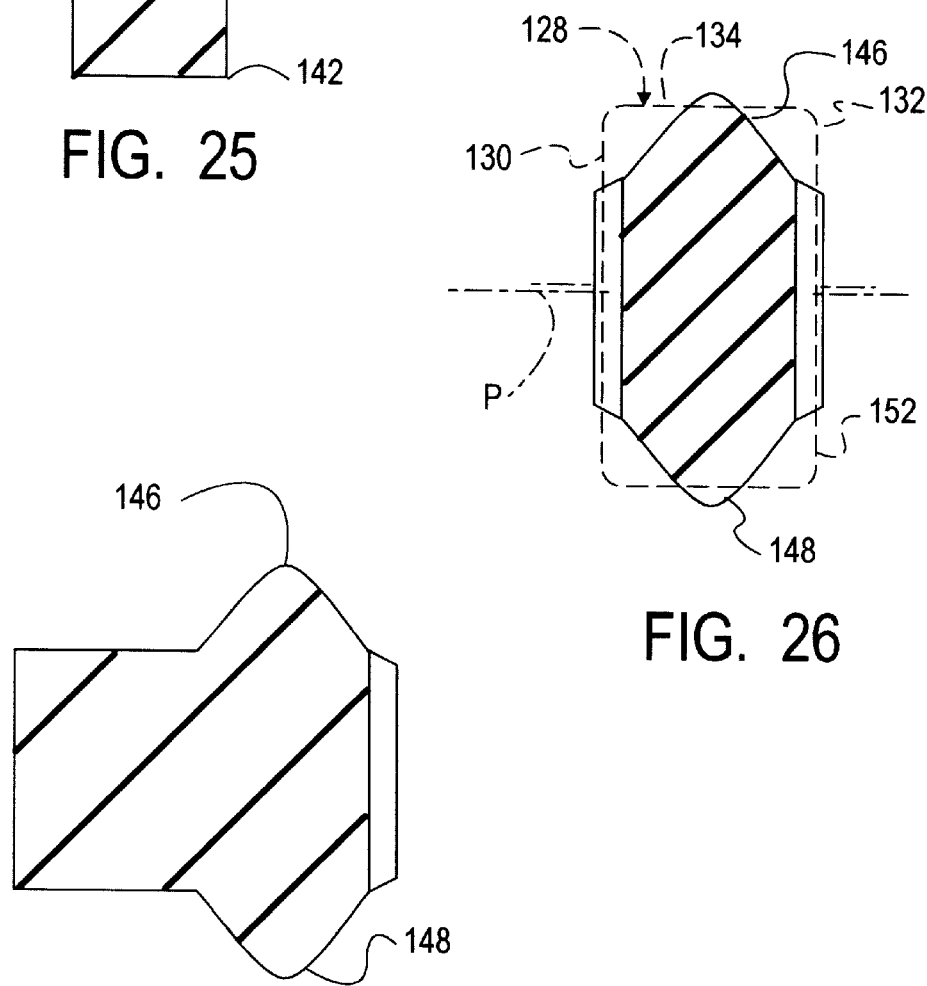
FIG. 26
FIG. 27

THROTTLE BODY MODULE HAVING IMPROVED FLUID TIGHTNESS

BACKGROUND OF THE INVENTION

1. Field of the Invention

This invention relates generally to throttles for controlling flow through intake systems of internal combustion engines, and more specifically to a throttle body module having improved fluid tightness.

2. Background Information, Including Reference to Related Patent Applications and Incorporation by Reference Spark-ignited, fuel-injected internal combustion engines enjoy extensive usage as the powerplants of automotive vehicles. A representative intake system for such an engine comprises a throttle body that has a through-bore within which a throttle blade, or throttle plate, also sometimes referred to as a butterfly, is disposed. The throttle blade is fastened to a cylindrical shaft whose axis is coincident with a diameter of the through-bore. The shaft is journaled on opposite wall portions of the throttle body for motion about its own axis. An actuator that is external to the through-bore selectively positions the shaft about its own axis, to thereby selectively position the throttle blade within the through-bore over a range of positions spanning a closed throttle position and a full open throttle position.

Various throttle bodies are documented in patent, and other, literature. Commonly owned, U.S. Pat. No. 5,979,871 discloses a Clamshell Throttle Body Assembly. That throttle body comprises two body halves that meet face-to-face at a common mating plane that is perpendicular to a central longitudinal axis of the throttle body that coincides with that of a central circular through-bore of the throttle body. The two body halves possess respective confronting faces at the common mating plane, and those faces circumscribe the circular through-bore through which filtered air is conveyed toward combustion chambers of the engine when the throttle body is in use on an engine. Formed in each face of the respective throttle body halves in adjoining relation to the through-bore at each of opposite ends of a diameter of the throttle body that lies in the common mating plane, is one half of a respective circular aperture centered on that diameter. The two faces thereby cooperatively form the two circular apertures, each diametrically opposite the other across the through-bore. Before the two body halves are assembled together, a throttle mechanism comprising a circular throttle blade of uniform thickness disposed on a throttle shaft is placed between the two faces for subsequent capture. As the throttle body halves are moved relative to one another to place their mutually confronting faces on the common mating plane, portions of the shaft that are beyond the perimeter of the throttle blade at each end of the diameter that is coincident with the shaft axis become captured between two confronting halves of each circular aperture at corresponding ends of the diameter. A respective circular annular bearing assembly is disposed on each respective portion of the shaft that is beyond the throttle blade perimeter. Each bearing assembly has an inner circular race, an outer circular race, and a plurality of ball bearing elements, or alternatively roller elements, that are captured between the inner and outer races. In the regions where the bearing assemblies are disposed, each of the two circular apertures cooperatively defined by the throttle body halves is fashioned with confronting circular shoulders that are coaxial with the throttle shaft axis and serve to capture the respective bearing assembly, not only circumferentially, but also in the direction of the diameter of the throttle shaft.

Proximate the confronting faces of the two throttle body halves at the common mating plane, the through-bore wall comprises two generally semi-circular ledges, one in one throttle body half and the other in the other throttle body half. Each ledge is spaced from the common mating plane a distance equal to one-half the thickness of the throttle blade. One ledge occupies essentially one semi-circumference of the throttle body, and the other, essentially an opposite semi-circumference. The throttle blade mounting on the shaft is via a through-slot in the that portion of the throttle shaft which spans the throttle body through-bore. The through-slot has a thickness that is just sufficient to allow the throttle blade to pass through and that is symmetric with respect to the shaft axis. Each ledge is spaced from the common mating plane along the direction of the through-bore axis, a distance equal to essentially one-half the throttle blade thickness. When the throttle blade is in closed position it assumes an orientation that is perpendicular to the through-bore axis, with opposite semi-circular margins of its circular perimeter being disposed flat against the opposite semi-circular ledges.

While the surface-to-surface abutment of the blade perimeter to the ledges in that clam shell type throttle body provides well-defined internal sealing of a flat circular throttle blade to the through-bore when the throttle is closed, the disclosure of that patent application does not address all sealing issues relating to a clam shell type throttle body, and it is toward resolution of such issues that the present invention is directed, and so in certain respects the present invention is a further improvement in the throttle body assembly of that patent application. A commonly-owned pending application entitled THROTTLE BODY MODULE HAVING IMPROVED BLADE TO LEDGE SEALING Ser. No. 09/260,331 (Attorney Docket No. 199-0218) relates to sealing of a closed throttle blade to a ledge in the throttle body through-bore. Another commonly-owned pending application entitled INTEGRATED THROTTLE BODY AND INTAKE MANIFOLD SPACER MODULE Ser. No. 09/260,323 relates to certain aspects of the module that is shown in the drawings of this disclosure. Still another commonly-owned pending application entitled THROTTLE BODY ACCOMMODATION OF EITHER AN IDLE AIR CONTROL VALVE OR A MOTORIZED THROTTLE CONTROL Ser. No. 09/260,988 relates to certain additional aspects of the module that is shown in the drawings of this disclosure.

The entire content of each of the four other commonly owned pending applications mentioned above is expressly incorporated herein by reference as if fully disclosed herein.

SUMMARY OF THE INVENTION

The present invention relates to improvements in sealing between throttle body halves that come together at a common mating plane to capture a throttle mechanism that includes a throttle blade disposed on a throttle shaft between bearing assemblies for journaling the shaft on the wall of the throttle body.

Other general and specific aspects will been set forth in the ensuing description and claims.

BRIEF DESCRIPTION OF THE DRAWINGS

The drawings that will now be briefly described are incorporated herein to illustrate a preferred embodiment of the invention and a best mode presently contemplated for carrying out the invention.

FIG. 24 is an enlarged cross section view in the direction of arrows 24—24 in FIG. 20.

FIG. 25 is an enlarged cross section view in the direction of arrows 25—25 in FIG. 20.

FIG. 26 is an enlarged cross section view in the direction of arrows 26—26 in FIG. 20.

FIG. 27 is an enlarged cross section view in the direction of arrows 27—27 in FIG. 20.

DESCRIPTION OF THE PREFERRED EMBODIMENT

Figure 1:
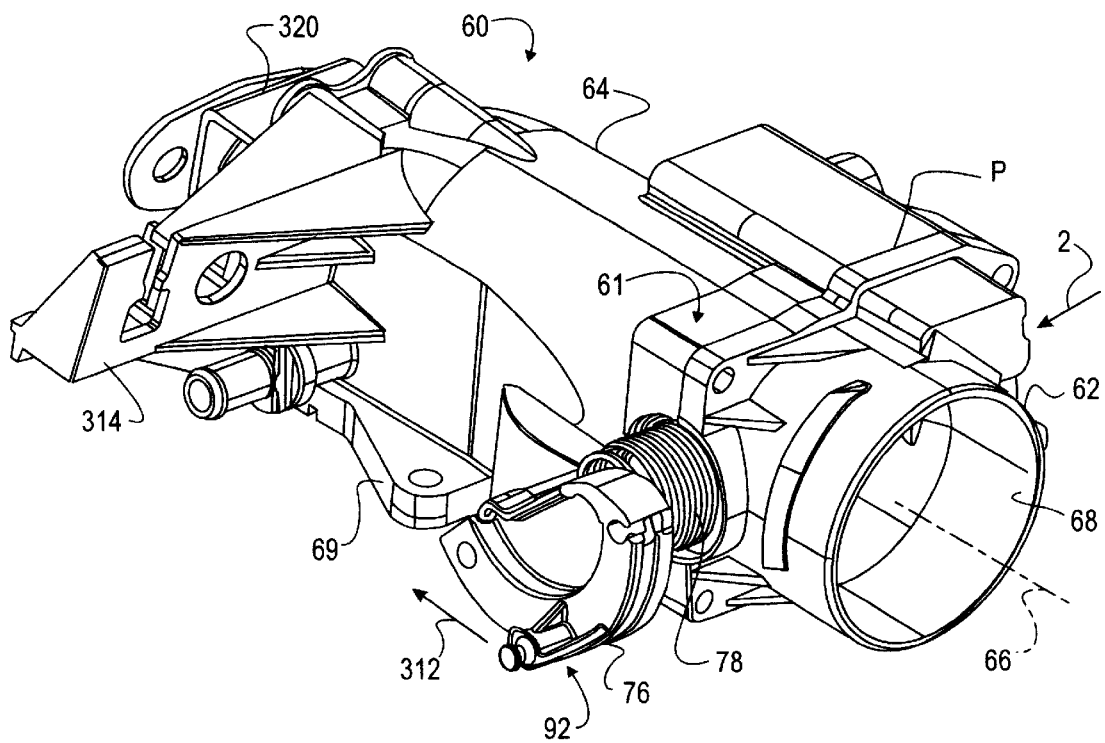
FIG. 1 is a perspective view of an exemplary engine air intake module containing a throttle body in accordance with principles of the present invention.
Figure 2:
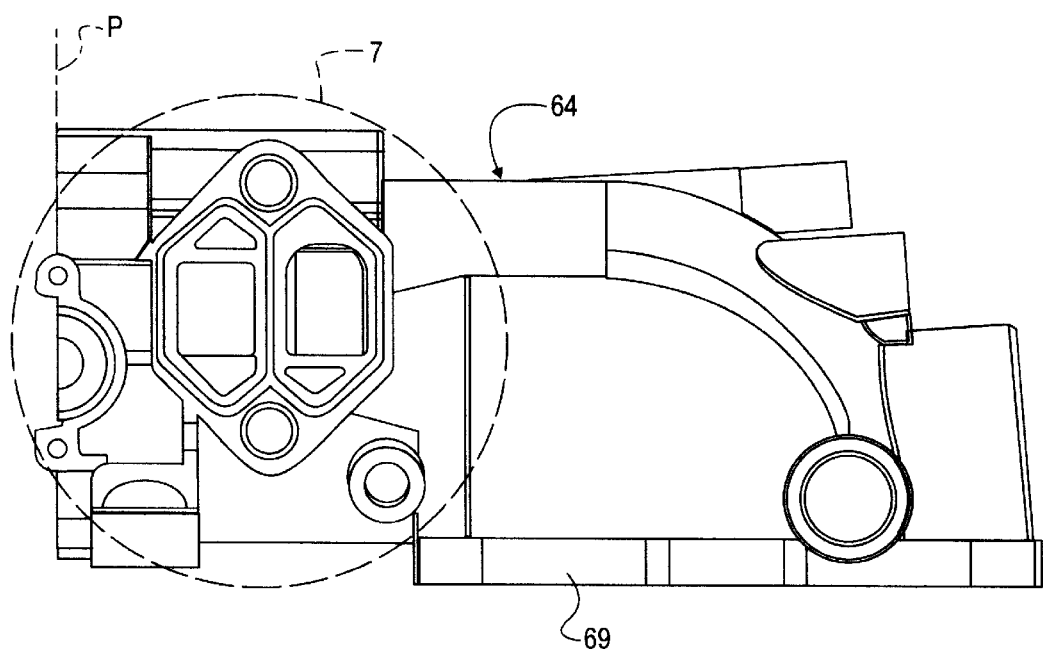
FIG. 2 is a front elevation view of one part of the module, a spacer, by itself in the general direction of arrow 2 in FIG. 1.
Figure 3:
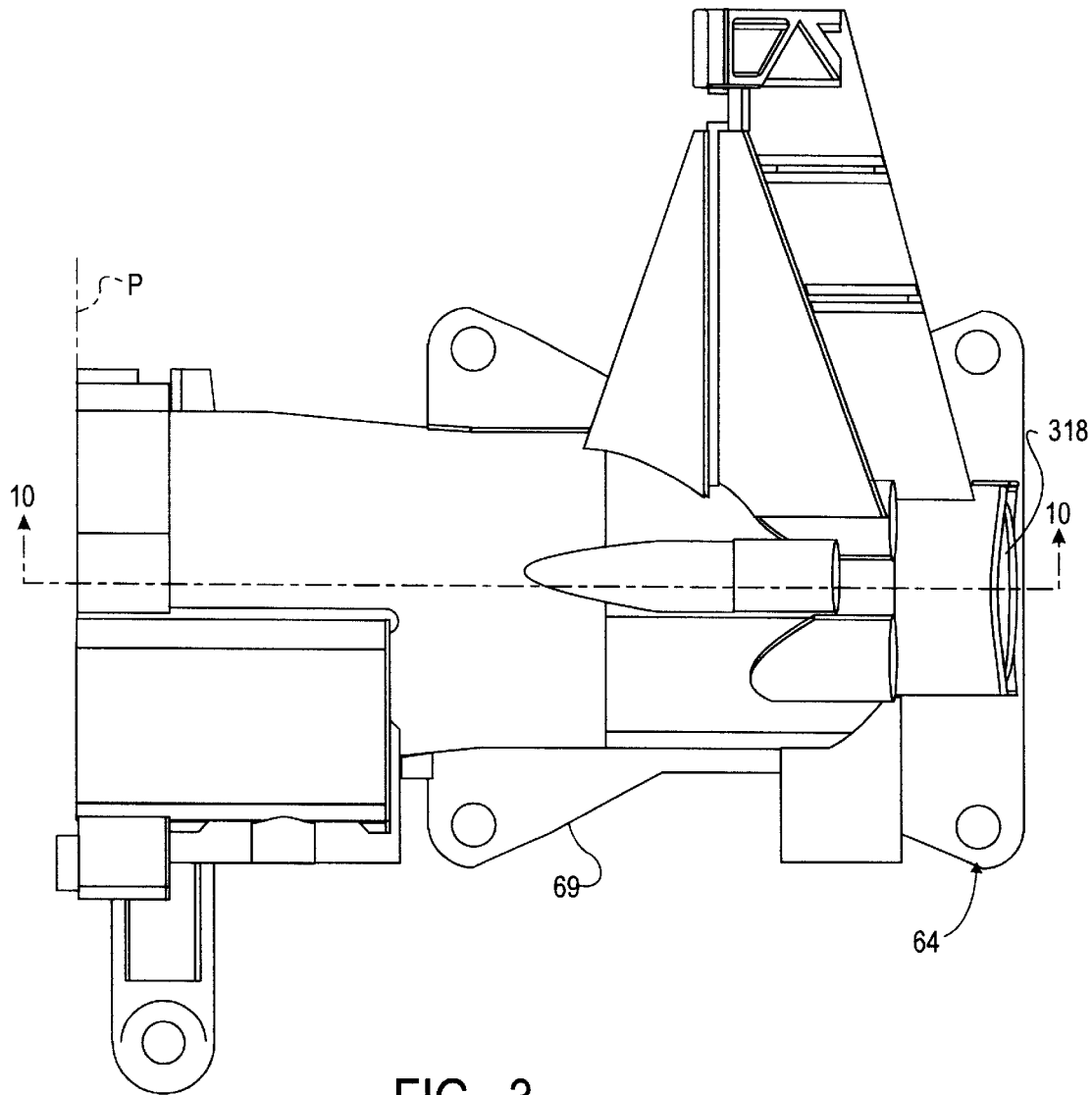
FIG. 3 is a top plan view of FIG. 2.
Figure 4:
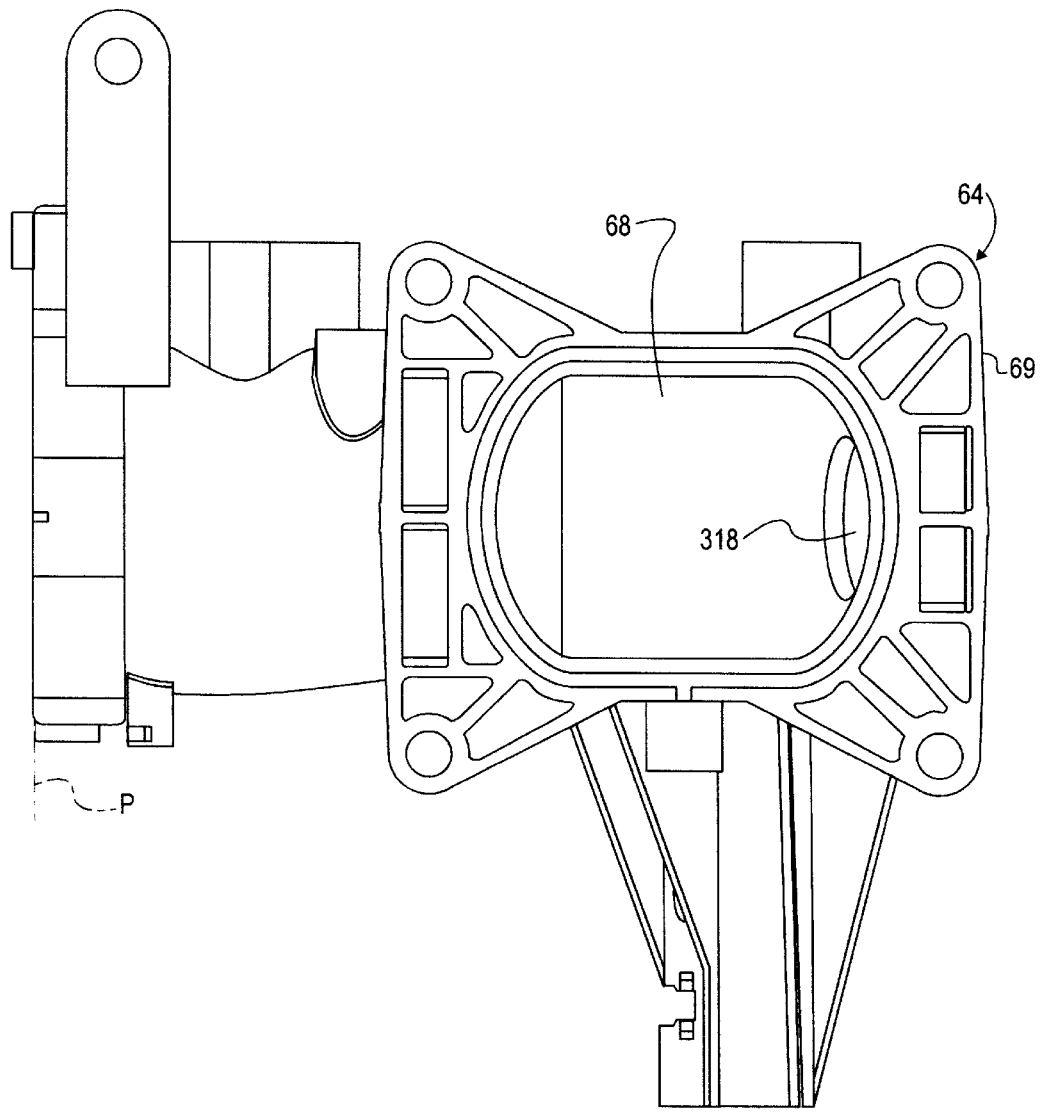
FIG. 4 is a bottom plan view of FIG. 2.
Figure 5:
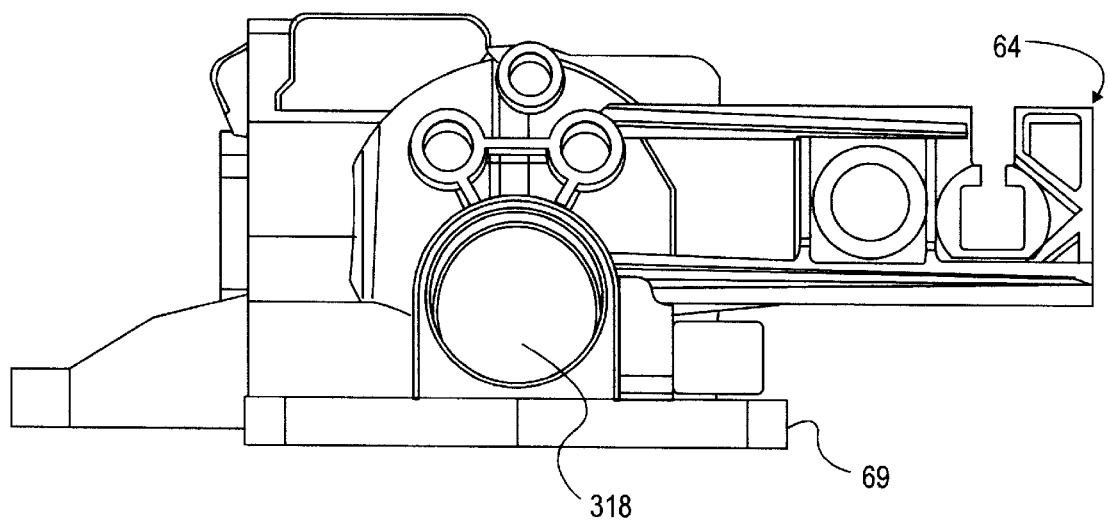
FIG. 5 is a right side view of FIG. 2.
Figure 6:
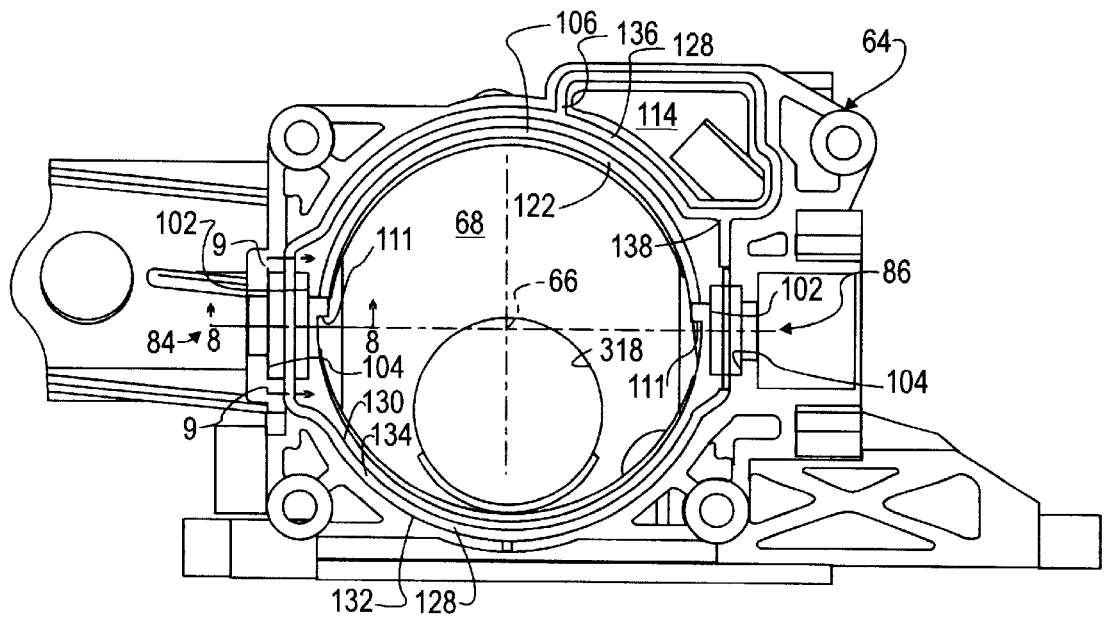
FIG. 6 is a left side view of FIG. 2.
Figure 8:
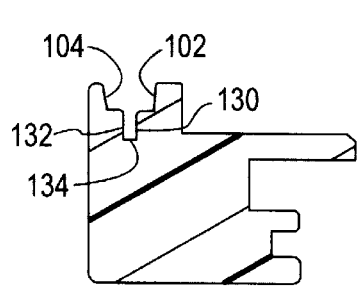
FIG. 8 is an enlarged cross section view in the direction of arrows 8—8 in FIG. 6.
Figure 9:
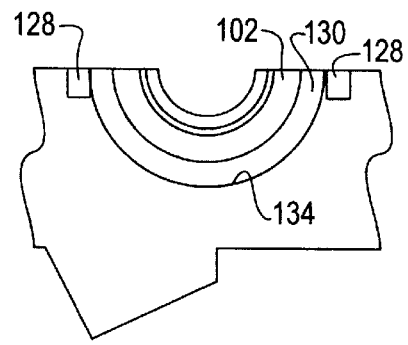
FIG. 9 is an enlarged cross section view in the direction of arrows 9—9 in FIG. 6.
Figure 7:
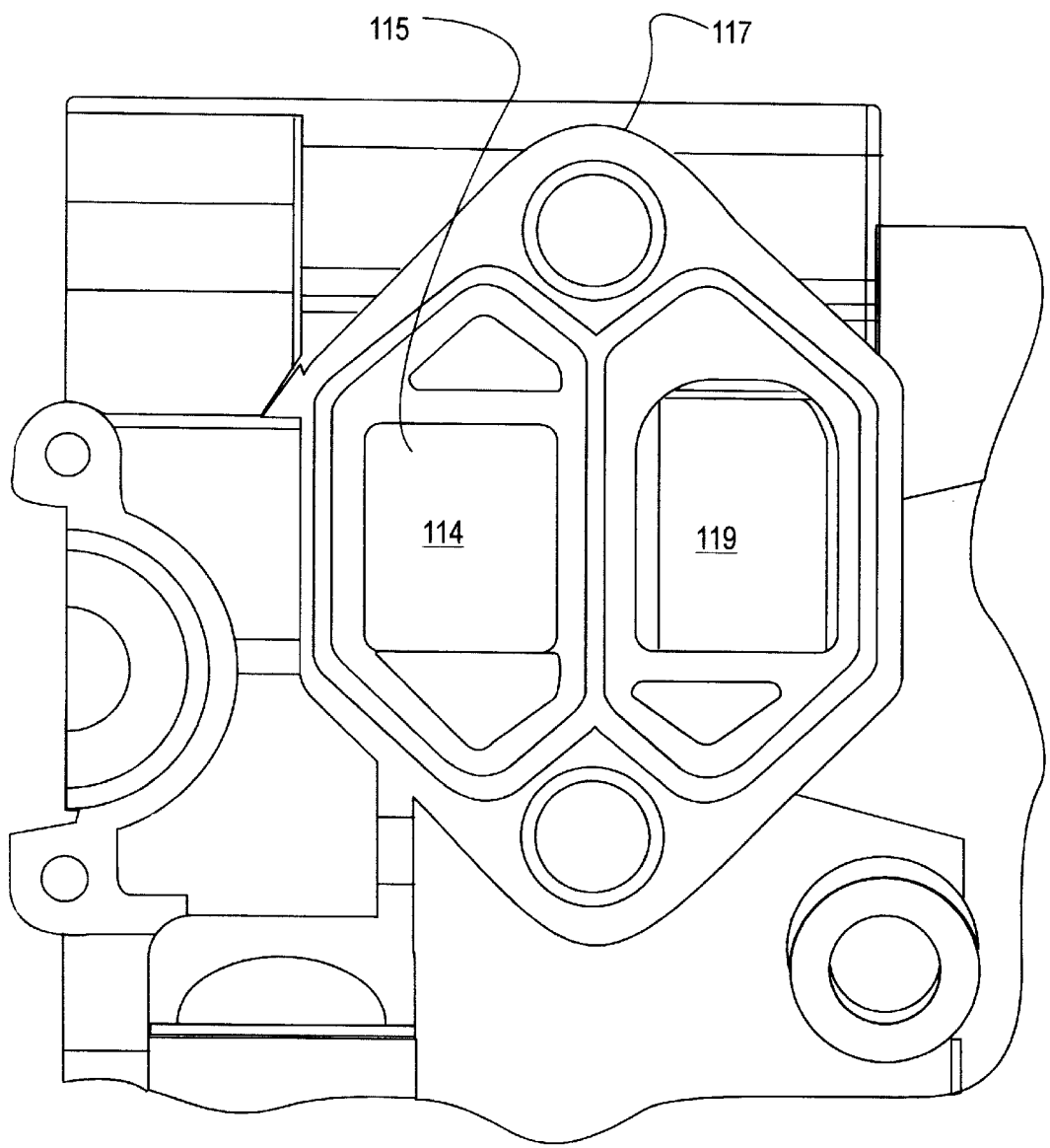
FIG. 7 is an enlarged view in oval 7 of FIG. 2.
Figure 10:
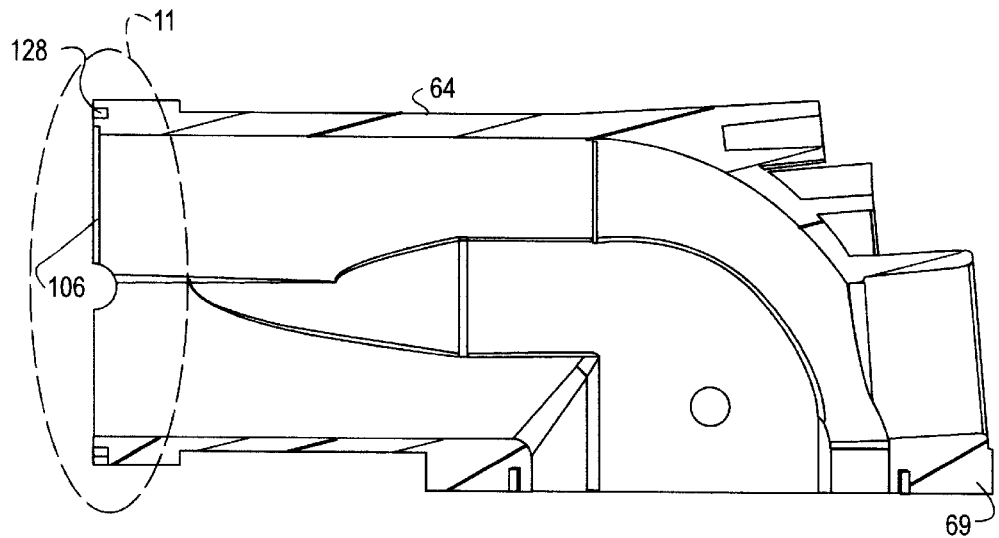
FIG. 10 is an enlarged cross section view in the direction of arrows 10—10 in FIG. 3.
Figure 12:
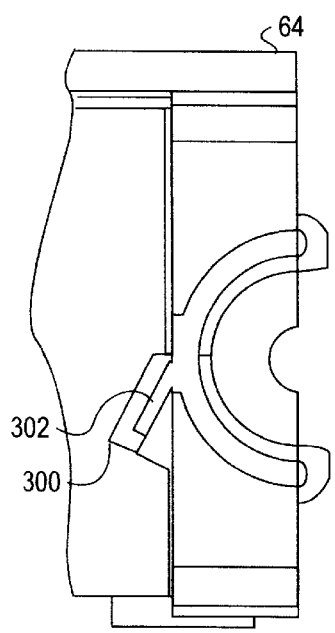
FIG. 12 is a fragmentary enlarged rear view of a portion of the one part in the general direction of arrow 12 in FIG. 1.
Figure 11:
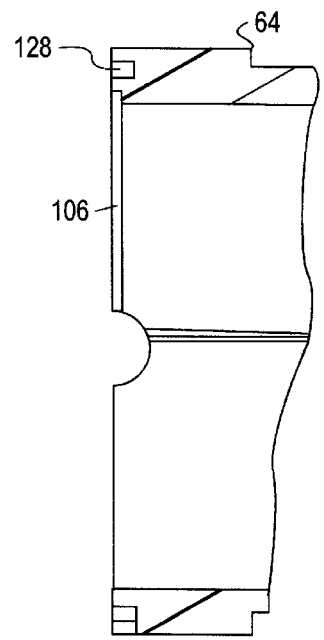
FIG. 11 is an enlarged view in oval 11 of FIG. 10.
Figure 13:
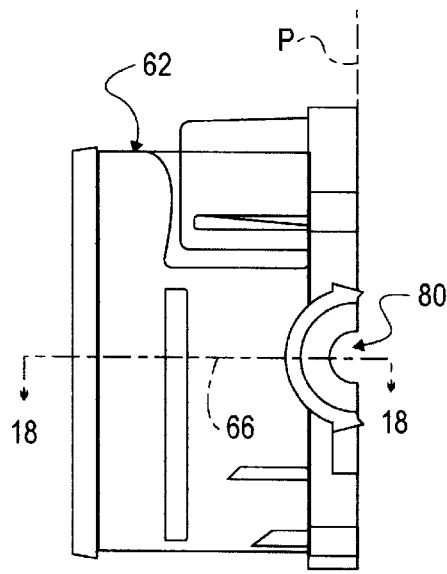
FIG. 13 is a front elevation view of another part of the module, an air intake, by itself.
Figure 14:
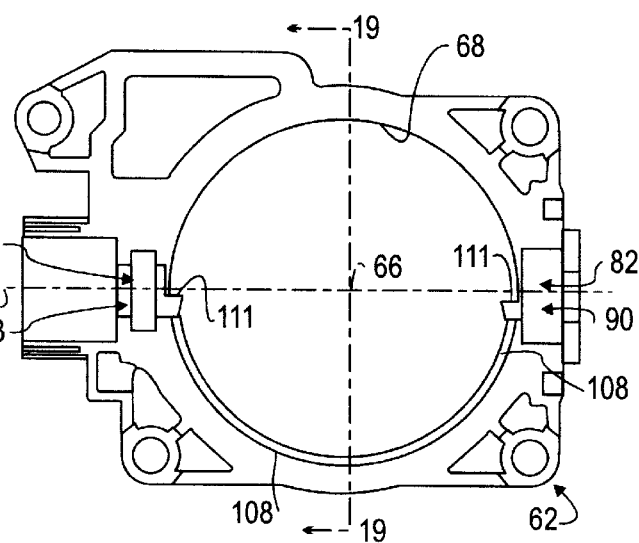
FIG. 14 is a right side view of FIG. 13.
Figure 15:
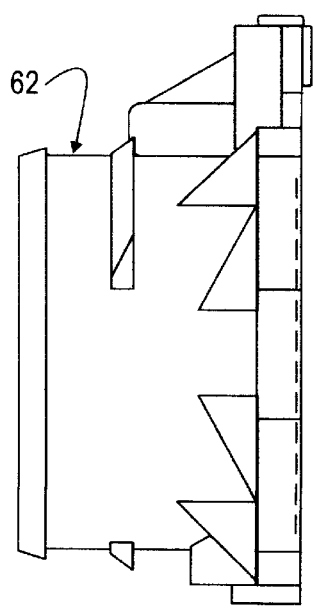
FIG. 15 is a bottom plan view of FIG. 13.
Figure 16:
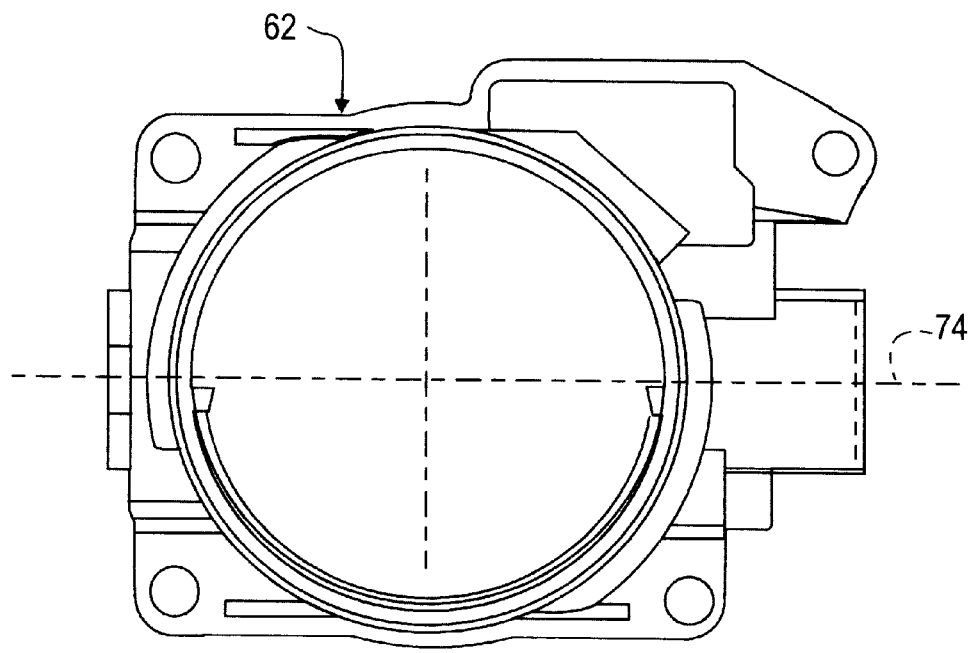
FIG. 16 is a left side view of FIG. 13.
Figure 17:
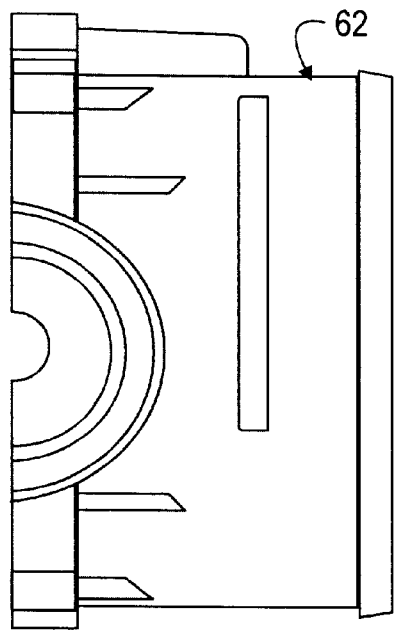
FIG. 17 is a rear view of FIG. 13.
Figure 18:
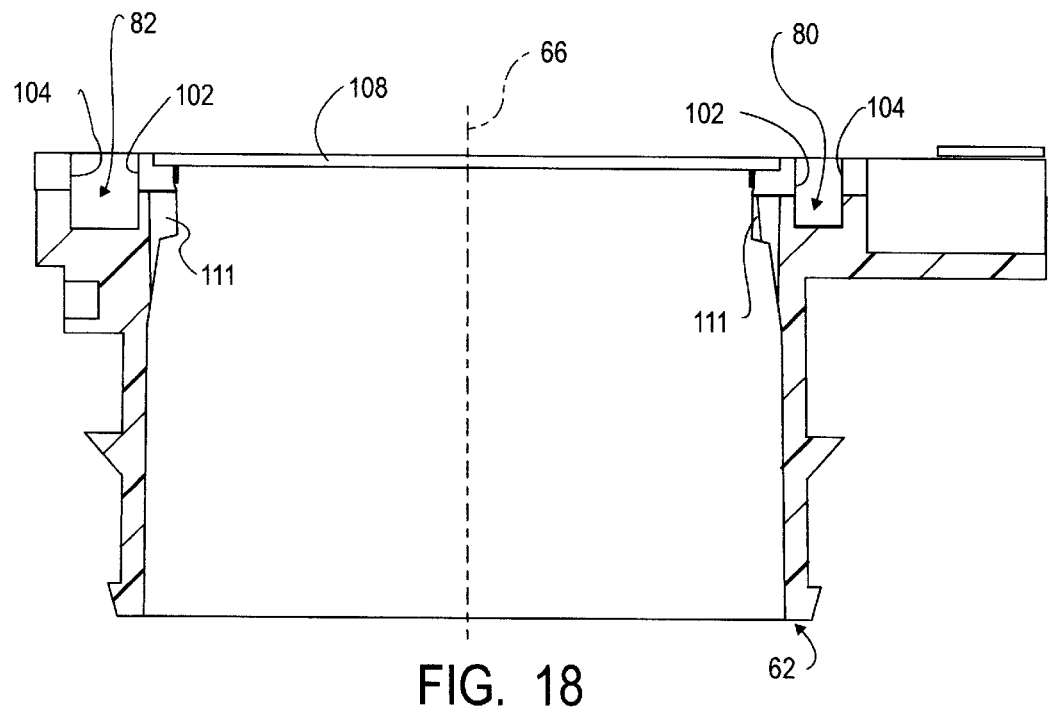
FIG. 18 is an enlarged cross section view in the direction of arrows 18—18 in FIG. 13.
Figure 19:
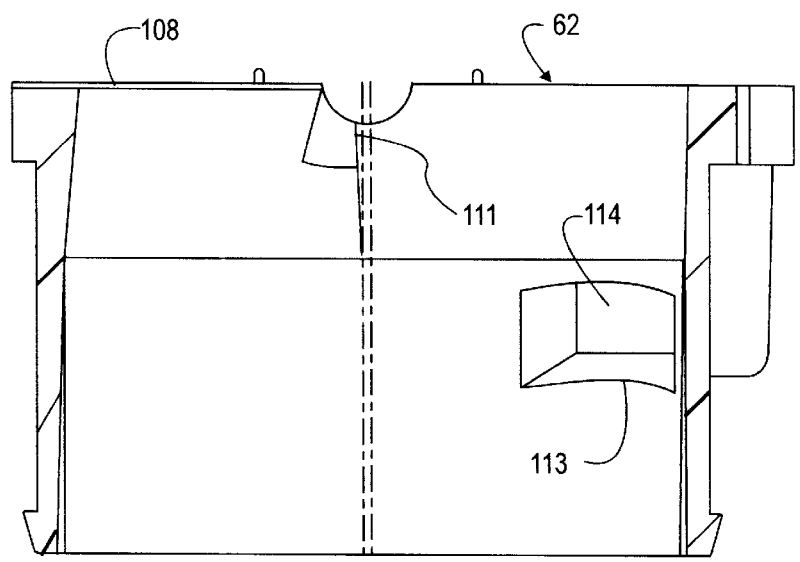
FIG. 19 is an enlarged cross section view in the direction of arrows 19—19 in FIG. 14.
Figure 21:
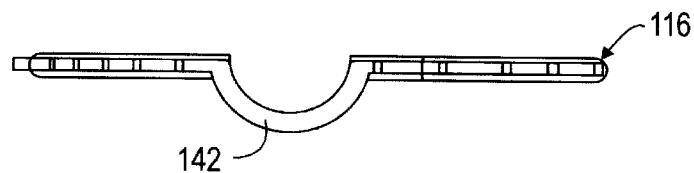
FIG. 21 is a top view of FIG. 20.
Figure 20:
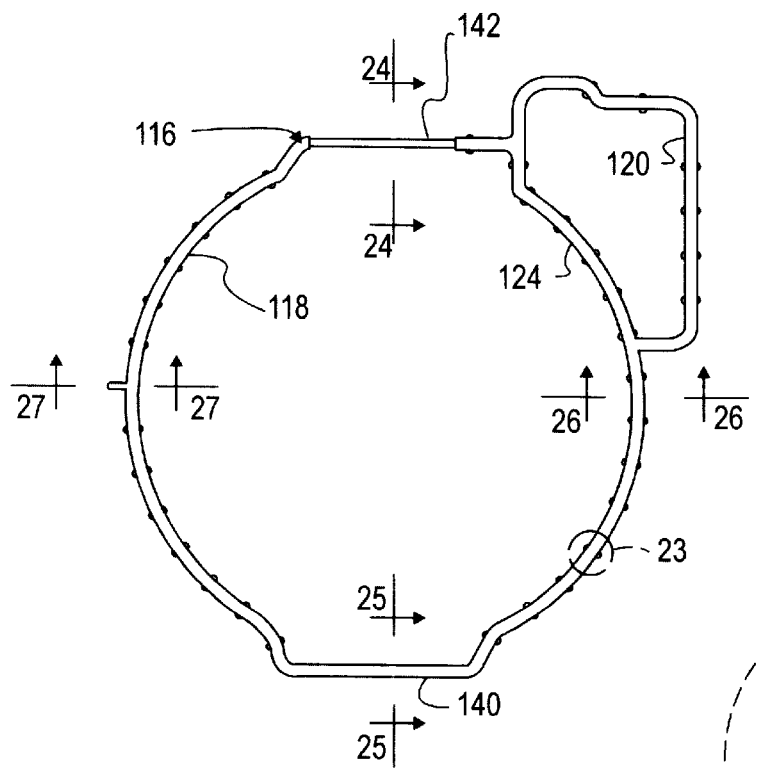
FIG. 20 is a plan view of still another part of the module, a gasket, by itself.
Figure 23:
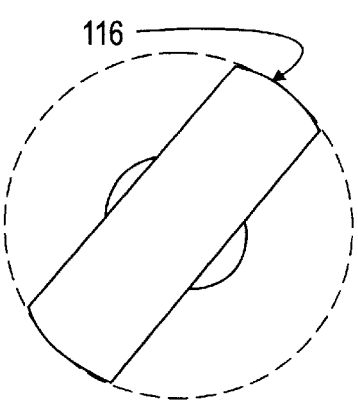
FIG. 23 is an enlarged view in circle 23 in FIG. 20.
Figure 22:
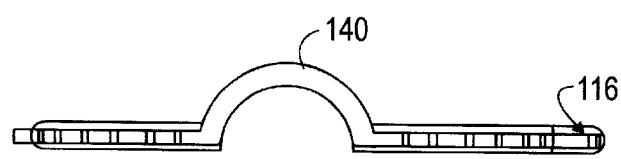
FIG. 22 is a bottom view of FIG. 20.

The drawing Figures show a module 60 comprising a throttle body 61 that embodies principles of the present invention. Module 60 comprises first and second body parts 62, 64, an air intake and a spacer respectively, that are disposed in succession along an imaginary central longitudinal axis 66. Body parts 62, 64 contain a through-bore 68 of nominally circular transverse cross section centered on axis 66. The through-bore is straight in air intake 62; in spacer 64, it begins as a straight continuation from air intake 62, but makes a right angle curve downward to end at a mounting flange 69 of spacer 64.

Figures 31, 32:
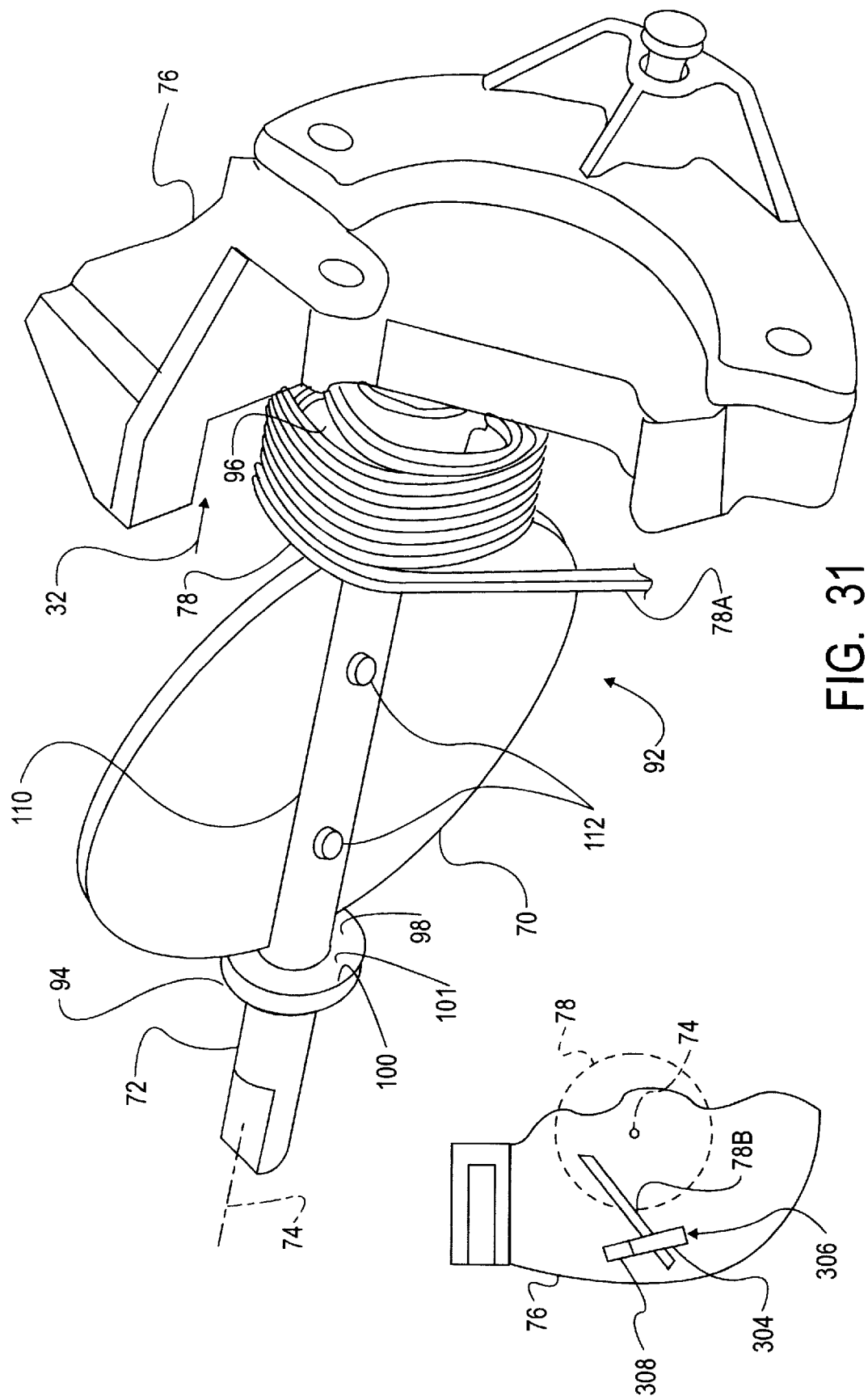
FIG. 31 is an enlarged perspective view of a throttle mechanism of the module by itself.
FIG. 32 is a fragmentary view in the general direction of arrow 32 in FIG. 31.

FIG. 31 shows a throttle mechanism 92. A throttle blade 70, alternatively sometimes referred to as a throttle plate or butterfly, is disposed within through-bore 68 and fastened to a cylindrical shaft 72 whose axis 74 is substantially coincident with a diameter of through-bore 68. Blade 70 is a circular disk of uniform thickness. Shaft 72 is journaled on opposite wall portions of throttle body 61 for motion about its own axis. Shaft 72 is operated by an actuator (not shown) that is operatively connected to a cam, or lever, 76 that is affixed to, such as by molding onto, an external end of shaft 72. A double coiled torsion return spring 78 acts between the exterior of throttle body 61 and cam 76 to spring-bias shaft 72, and hence blade 70 as well, about axis 74 to a position that closes through-bore 68. When cam 76 is actuated against the spring bias to selectively position shaft 72 about axis 74, it selectively positions throttle blade 70 within through-bore 68. In this way, throttle blade 70 may be selectively positioned over a range of positions spanning a closed throttle position and a full open throttle position.

Body parts 62 and 64 meet face-to-face at a common mating plane P that is perpendicular to axis 76 and that contains axis 74. Parts 62 and 64 possess respective confronting faces at the common mating plane, and those faces circumscribe through-bore 68. Formed in each of the two confronting faces of parts 62 and 64 in adjoining relation to through-bore 68 at each of opposite ends of a diameter of throttle body 61 that lies in the common mating plane, is one half of a respective circular aperture substantially centered on that diameter. Hence, part 62 has half-apertures 80, 82, and part 64, half-apertures 84, 86. The two half-apertures 80, 84 thereby cooperatively form one circular aperture 88, while half-apertures 82, 86 form the other circular aperture 90. The two apertures 88, 90 are substantially diametrically opposite each other across through-bore 68.

Before air inlet 62 and spacer 64 are assembled together, a portion of throttle mechanism 92 that includes throttle blade 70, shaft 72, cam 76, spring 78, as well as two circular annular bearing assemblies 94, 96, is placed between the two faces. Specifically, bearing assemblies 94, 96 are disposed on shaft 72 beyond the perimeter of throttle blade 70 for subsequent capture within the respective apertures 88, 90, while throttle blade 70 is disposed for placement within through-bore 68. As parts 62, 64 are moved relative to one another to place their mutually confronting faces on plane P, half-apertures 80, 84 close on bearing assembly 94, and half-apertures 82, 86 close on bearing assembly 96.

Each circular annular bearing assembly has an inner circular race 98, an outer circular race 100, and a plurality of ball bearing elements, or alternatively roller elements, that are captured between the inner and outer races to enable the inner race to freely revolve within the outer race. The open annular spaces between each inner and outer race on opposite sides of each bearing assembly are sealed by seals 101 of the bearing assembly. In the regions where bearing assemblies 94, 96 are disposed, each of the two circular apertures 88, 90 has confronting circular shoulders 102, 104 that are coaxial with axis 74 and serve to capture the respective bearing assembly, not only circumferentially, but also in the direction of the length of throttle shaft 72. Apertures 88, 90 capture the outer races 100, allowing the inner races 102, into which shaft 72 is pressed, to freely revolve, thereby providing low-friction journaling of throttle mechanism 92 on throttle body 61.

Proximate the confronting faces of parts 62, 64 at plane P, the wall of through-bore 68 comprises two generally semi-circular ledges 106, 108, one in part 62 and the other in part 64. Each ledge 106, 108 is spaced from the common mating plane a distance equal to one-half the thickness of throttle blade 70. One ledge occupies essentially one semi-circumference of throttle body 61, and the other, essentially an opposite semi-circumference. The mounting of throttle blade 70 on shaft 72 is via a through-slot 110 in that portion of shaft 72 which spans through-bore 68. Through-slot 110 has a thickness that is just sufficient to allow throttle blade 70 to pass through and that is symmetric with respect to axis 74. Screws 112 secure the attachment of blade 70 to shaft 72. Ledge 106 is spaced from plane P along the direction of axis 66, a distance equal to essentially one-half the throttle blade thickness. Ledge 106 occupies a planar surface that is flat and perpendicular to axis 66. When blade 70 is closed, its half that closes on ledge 106 assumes an orientation that is essentially perpendicular to axis 66 providing an essentially flush surface-to-surface sealing contact of the corresponding portion of its perimeter margin with ledge 106.

As explained in the referenced application Ser. No. 09/260,331, the same may not be true of the blade half that closes against ledge 108. While the surface-to-surface abutment of the blade perimeter to both ledges 106, 108 provides well defined internal sealing of the blade to through-bore 68 when the throttle is closed, a further sealing improvement may be obtained by making the downstream facing surface of ledge 108 depart slightly from a planar one that is flat and perpendicular to axis 66. The better fluid tightness resulting from this sealing improvement can be important from the standpoint of engine idle operation and related exhaust emission control when an idle air bypass valve parallels the throttle to control air flow into the engine at idle when the throttle is closed.

The detailed relationship of ledge 108 to throttle blade 70 is described in that referenced application, and will not be explicitly repeated here in the interest of brevity. Briefly, the surface of ledge 108 departs slightly from one that is flat and perpendicular to axis 16 throughout its full extent, very gradually ramping, or sloping, toward air inlet 62 in both clockwise and counterclockwise directions from a location on the ledge that is 90° from the throttle shaft axis. This slight sloping allows the ledge surface to better conform to the deformation that occurs in the half of the throttle blade that closes on that ledge when the throttle is operated closed, and thereby enhance the sealing effectiveness of the blade to the throttle body wall despite slight blade deformation that occurs due to intake manifold vacuum while the blade is closed.

Within through-bore 68 proximate plane P, each part 62, 64 contains small protrusions that provide stops 111 for limiting the extent to which throttle blade 70 can maximally open. On the exterior of part 64 proximate plane P is a boss 300 that contains a slot 302. The slot is open toward cam 76, and is shaped to receive a tail 78A of spring 78. As shown by FIG. 32, the face of cam 76 that is toward part 64 contains a hook formation 304 that is open at 306 and joined to the cam at a location 308. The other tail 78B of spring 78 is shown lodged in the throat of the hook formation, bearing against location 308. In the operative throttle body, spring 78 is wound to impart a bias force that causes throttle blade 70 to be forcefully closed. The blade can be opened by applying an opposite force to cam 76, such as by an operating cable of a sheathed cable assembly (not shown) that pulls on the cam in the manner suggested by arrow 312 in FIG. 1. Such a cable may run to a bracket 314 that is integrally formed in part 64 and secures the sheath within which the cable slides. By having the spring tails associate with the cam and the throttle body in the manner shown, assembly of mechanism 92 to the throttle body is facilitated. Before the two parts 62, 64 are placed together to capture mechanism 92, mechanism 92 may be associated with part 64 to insert tail 78A into slot 302 with tail 78B caught in the throat of hook formation 304. The far end of part 64 opposite plane P has an opening 318 for association with an EGR system through which EGR is introduced into the intake flow. A stand-off bracket 320 in FIG. 1 fits to the opening and provides for mounting of an EGR valve (not shown) such that EGR can be introduced in a sealed manner into through-bore 68.

Throttle body 61 includes an idle air by-pass passage 114 that by-passes throttle blade 70. Passage 114 has an entrance 113 at the side wall of through-bore 68 in part 62 so as to be open to the through-bore in part 62. Passage 114 has an exit 115 open at the outside of part 64 to communicate with an idle air control valve (not shown) that mounts on the outside of part 64 in sealed relation to a mounting flange 117. An inlet port of the valve registers with the exit of passage 114, and an outlet port of the valve registers with a hole 119 through the side wall of part 64 back to through-bore 68. Hence, part 62 contains an upstream portion of passage 114, and part 64, a downstream portion, with the two portions meeting at mating plane P.

Still further improvement in fluid tightness is achieved by the organization and arrangement of a gasket 116 a first embodiment of which is shown by itself in FIGS. 20–27. Gasket 116 comprises a primary, larger sealing ring 118 and a secondary, smaller sealing ring 120. Ring 118 is for sealing between parts 62 and 64 around through-bore 68 while ring 120 is for sealing between parts 62 and 64 around idle air by-pass passage 114. Because through-bore 68 and passage 114 share a common wall portion 122, rings 118 and 120 can likewise share a common portion 124. In effect, ring 120 branches from ring 118.

For receiving gasket 116, the face of part 64 disposed at plane P comprises an endless channel 128 that has a nominally rectangular shape in cross section comprising spaced apart side walls 130, 132 spanned by a bottom wall 134 and open at the top. Channel 128 runs endlessly in a circumferential sense about axis 66 to surround through-bore 68. It branches at locations marked 136, 138 to create an adjoining encirclement of idle air by-pass passage 114 where common portion 124 seals both through-bore 69 and passage 114.

At the locations of half-apertures 84, 86, channel 128 follows the semi-circular contour along the portion of each that is between the two shoulders 102, 104. Channel 128 is essentially centered between shoulders 102, 104 as it follows the semi-circular contour of each half-aperture 84, 86, the channel's width across side walls 130, 132 being less than the dimension between each pair of shoulders.

Where sealing ring 118 associates with half-apertures 84, 86, it has semi-circular loops 140, 142, the cross section shapes of which are shown by FIGS. 24 and 25 respectively. At these locations, channel 128 is similarly semi-circularly shaped. The width of channel 128 in half-aperture 86 is smaller than its width in half-aperture 84 because the latter half-aperture is made wider than the former to accept a wider bearing assembly 96 than bearing assembly 94 accepted by half-aperture 86. Hence, gasket loop 140 is narrower in width than gasket loop 142, but the inner semi-circular surfaces of both loops include centrally disposed ridges 144, of semi-circular cross section, for sealing to the outside semi-circumferences of the outer bearing races.

In the remainder of sealing ring 118 that excludes loops 140, 142, gasket 116 has a nominally rectangular cross section from opposite axial faces of which respective sealing ridges 146, 148 protrude in opposite axial (axial being referenced to axis 66) directions from an imaginary median 150 that axially bisects the cross section. The respective sealing ridges 146, 148 are somewhat triangular in cross section, having rounded apices. The ends of the ridges 146 merge with the ends of ridges 144 for endless circumferential continuity of sealing surfaces.

When gasket 116 is associated with channel 128, the rectangular cross sectioned portions of loops 140, 142 seat in the corresponding portions of channel 128, sealing thereto in the process, allowing ridges 144 to protrude to seal to the outer races of the bearing assemblies. The remainder of ring 118 fits snugly to the remainder of channel 128 to complete the surround of through-bore 68, with ridges 146 sealing against bottom channel wall 134. Ring 120 fits in like fashion to the channel portion surrounding passage 114.

When the confronting faces of parts 62, 64 come together at plane P, capturing bearing assemblies 94, 96 in the process, the opposite ridge 148 seals to part 62. If part 62 has a channel 152 that is like channel 128 the ridge's apex may seal to the bottom channel wall. The final result is that the gasket circumferentially seals around each of through-bore 68 and passage 114 at the joint where air intake 62 and spacer 64 come together.

When one recognizes that an idling engine develops substantial intake manifold vacuum, the benefit of the improved sealing provided by gasket 116 between the outer bearing races and part 64 can be appreciated. Because throttle blade 70 is sealing against ledges 106, 108 at idle, intake manifold vacuum is applied not only to the exposed downstream face of throttle blade 70, but also to that portion of the throttle mechanism journal that is downstream of plane P. In the absence of associating gasket 66 with half-apertures 84, 86 and bearing assemblies 94, 96 as has been disclosed herein, a potential exists for air to be drawn by the intake manifold vacuum through a path, albeit small, that would be present through opposite sides of the throttle body wall between each outer bearing and the respective half-aperture. Any such air intrusion would parallel the idle air flow through the idle air passage that is being controlled by the associated idle air by-pass valve, and could impair the desired idle air control strategy that is being employed. Gasket 116 forecloses that possibility.

Figure 29:
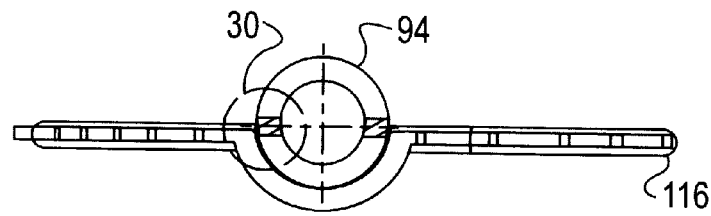
FIG. 29 is a view of the modified form in the same direction as the view of FIG. 21.
Figure 30:
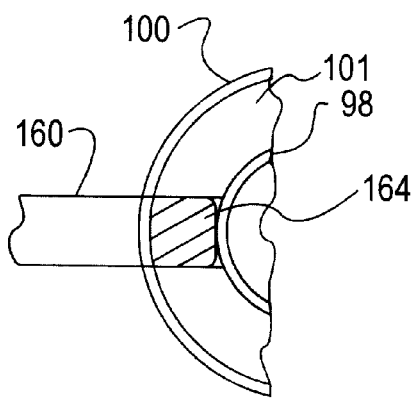
FIG. 30 is an enlarged view in circle 30 in FIG. 29.
Figure 28:
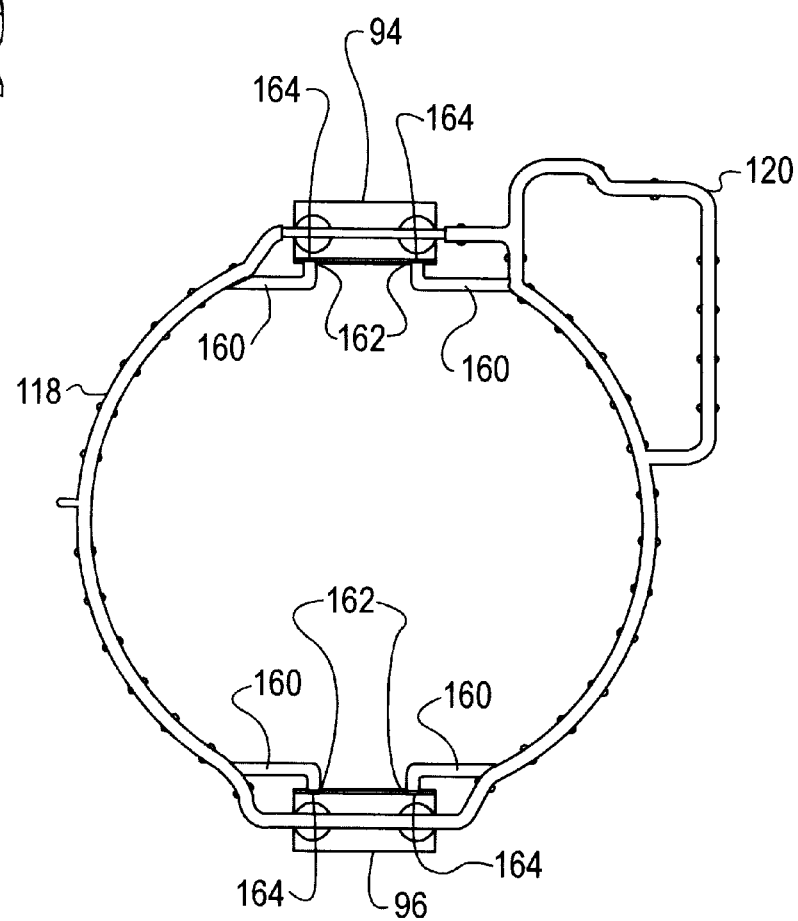
FIG. 28 is a view similar to FIG. 20 showing a modified form.

A second embodiment of gasket 116 shown in FIGS. 28–30 possesses additional features that provide further sealing improvement. Those features are two fingers 160 that project from ring 120 proximally adjacent each half aperture. Each pair of fingers 160 branch from ring 120 toward each other in the plane of plane P. While each finger passes across outer bearing race 100 from opposite directions without contacting it, fingers 160 terminate in inwardly curved finger tips 162 that have flat sealing faces 164 that contact the outer face of a respective annular seal element 101 of the respective bearing assembly 94, 96 that closes a space that would otherwise be open between the inner and outer races. The fingers serve to seal off a potential leak path, albeit small, through each bearing assembly. Although not specifically shown in a drawing Figure, the channels for the gasket in the confronting faces of parts 62, 64 may be modified to accommodate the fingers so that they, too are received in the channels. Sealing such potential leak paths as the fingers do may be important for reasons like those expressed above in connection with ledge 108.

It is to be appreciated that certain details of the embodiments that do not bear directly on the inventive principles may have been neither specifically illustrated nor explicitly described, and it should be understood that good engineering and manufacturing practices are to be employed in practicing the inventive principles in their application to particular throttle bodies.

While a presently preferred embodiment has been illustrated and described, it is to be appreciated that the invention may be practiced in various forms within the scope of the following claims.

What is claimed is:

1. A throttle for an internal combustion engine air intake comprising a throttle body having a through-bore extending along a longitudinal axis for conducting intake flow from an upstream direction toward a downstream direction, a throttle blade disposed within the through-bore on a cylindrical shaft having an axis of turning substantially coincident with a diameter of the through-bore and journaled via bearing assemblies on opposite wall portions of the throttle body for turning about its own axis to selectively position the throttle blade within the through-bore over a range of positions spanning a closed throttle position closing the through-bore to flow and open positions; the throttle body comprising a first upstream body part containing an upstream portion of the through-bore and a second downstream body part containing a downstream portion of the through-bore, the two body parts being joined together to register the downstream portion of the through-bore as a continuation of the upstream portion at respective confronting faces of the two body parts, capturing the bearing assemblies between the confronting faces to thereby journal the shaft on the opposite wall portions of the throttle body, and including a gasket disposed between the confronting faces to circumferentially seal the through-bore, including sealing between the bearing assemblies and one of the confronting faces, in which the gasket seals between the bearing assemblies and the confronting face of the second throttle body part, the confronting face of the downstream throttle body part comprises semi-circular apertures that receive respective semi-circular portions of the bearing assemblies, and the gasket comprises semi-circular loops sealing between the semi-circular portions of the bearing assemblies and the semi-circular apertures, the bearing assemblies comprise circular outer races and the semi-circular gasket loops seal to the outer races, and the gasket further includes, in association with each semi-circular loop, a pair of fingers, each of which extends from a location proximate a respective opposite end of the respective semi-circular loop toward the shaft and into radially overlapping relationship with a respective bearing assembly.

2. A throttle as set forth in claim 1 in which each finger includes a finger tip that extends to contact an annular seal of the respective bearing assembly that is disposed radially inward of the bearing assembly outer race.

3. A throttle as set forth in claim 2 in which the confronting face of the second throttle body part comprises an endless channel around the through-bore, and the gasket is received in the channel.

4. A throttle as set forth in claim 3 in which the confronting face of the first throttle body part comprises a channel within which those portions of the gasket other than the semi-circular loops are received.

5. A throttle for an internal combustion engine air intake comprising a throttle body having a through-bore extending along a longitudinal axis for conducting intake flow from an upstream direction toward a downstream direction, a throttle blade disposed within the through-bore on a cylindrical shaft having an axis of turning substantially coincident with a diameter of the through-bore and journaled via bearing assemblies on opposite wall portions of the throttle body for turning about its own axis to selectively position the throttle blade within the through-bore over a range of positions spanning a closed throttle position closing the through-bore to flow and open positions, the bearing assemblies comprising circular outer races; the throttle body comprising a first upstream body part containing an upstream portion of the through-bore and a second downstream body part containing a downstream portion of the through-bore, the two body parts being joined together to register the downstream portion of the through-bore as a continuation of the upstream portion at respective confronting faces of the two body parts, capturing the bearing assemblies between the confronting faces to thereby journal the shaft on the opposite wall portions of the throttle body, and including a gasket disposed between the confronting faces, and having contact with the outer races of the bearing assemblies along a semi-circumference of each outer race, circumferentially sealing the through-bore, and the gasket further includes, in association with each bearing assembly, a pair of fingers, each of which extends from a location proximate a respective end of the semi-circumference of the respective bearing assembly outer race into radially overlapping relationship to, and contact with, the respective bearing assembly.

6. A throttle as set forth in claim 5 in which the gasket has contact with the outer races of the bearing assemblies between the semi-circumference of each outer race and the confronting face of the downstream throttle body part.

7. A throttle as set forth in claim 5 in which each finger includes a finger tip that extends to contact an annular seal of the respective bearing assembly that is disposed radially inward of the bearing assembly outer race.

* * * * *